United States Patent
Murakami et al.

(10) Patent No.: US 7,562,641 B2
(45) Date of Patent: Jul. 21, 2009

(54) METHOD AND DEVICE FOR MEASURING CIRCULATION QUANTITY OF BED MATERIAL IN CIRCULATING FLUIDIZED BED COMBUSTOR

(75) Inventors: Takahiro Murakami, Koto-ku (JP); Koubun Kyo, Koto-ku (JP); Toshiyuki Suda, Koto-ku (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 182 days.

(21) Appl. No.: 11/813,250

(22) PCT Filed: Dec. 27, 2005

(86) PCT No.: PCT/JP2005/023855

§ 371 (c)(1),
(2), (4) Date: Jul. 2, 2007

(87) PCT Pub. No.: WO2006/075519

PCT Pub. Date: Jul. 20, 2006

(65) Prior Publication Data

US 2008/0153048 A1     Jun. 26, 2008

(30) Foreign Application Priority Data

Jan. 11, 2005  (JP) .............................. 2005-003911

(51) Int. Cl.
*F23C 10/06* (2006.01)
(52) U.S. Cl. ................. 122/4 D; 122/406.1; 465/104.16
(58) Field of Classification Search ................. 122/4 D, 122/406.1; 110/245, 345; 165/104.16; 432/58, 432/152
See application file for complete search history.

(56) References Cited

U.S. PATENT DOCUMENTS

| | | | | |
|---|---|---|---|---|
| 4,155,313 A | * | 5/1979 | Moss | 110/106 |
| 4,453,950 A | * | 6/1984 | Fasching | 48/86 R |
| 4,647,444 A | * | 3/1987 | Voll et al. | 423/449.2 |
| 4,813,479 A | * | 3/1989 | Wahlgren | 165/104.16 |
| 5,390,612 A | * | 2/1995 | Toth | 110/245 |

(Continued)

FOREIGN PATENT DOCUMENTS

JP    06-174378    6/1994

(Continued)

OTHER PUBLICATIONS

U.S. Appl. No. 11/813,250, filed Jul. 2, 2007, Murakami et al.

(Continued)

*Primary Examiner*—Gregory A Wilson
(74) *Attorney, Agent, or Firm*—Oblon, Spivak, McClelland, Maier & Neustadt, P.C.

(57) ABSTRACT

In order to quantitatively evaluate actual circulation quantity of bed material extremely simply and to enhance accuracy of comparison of results of thermal balance examined through simulation or the like with actual operation results, time is measured which is required for bed material in a downcomer 5 to reach an upper predetermined height $H_1$ from a lower reference height $H_0$ during stopped feeding of fluidizing air to an external heat exchanger 7; a flow rate of the bed material as circulation quantity is determined from the time and an accumulated amount of the bed material based on an inner diameter D of the downcomer 5.

6 Claims, 3 Drawing Sheets

U.S. PATENT DOCUMENTS 5,682,828 A * 11/1997 Phalen et al. ................ 110/245
6,073,682 A *  6/2000 Klaren ................... 165/104.16

FOREIGN PATENT DOCUMENTS

| | | |
|---|---|---|
| JP | 2000-274604 | 10/2000 |
| JP | 2001-289406 | 10/2001 |
| JP | 2002-106808 | 4/2002 |
| JP | 2003-185116 | 7/2003 |
| JP | 2005-233460 | 9/2005 |

OTHER PUBLICATIONS

U.S. Appl. No. 11/916,365, filed Dec. 3, 2007, Kyo et al.

Clive E. Davies, et al., "A Device for Measuring Solids Flowrates: Characteristics, and Application in a Circulating Fluidized Bed", Fluidization VII, 1992, pp. 742-748.

U.S. Appl. No. 11/813,250, filed Jul. 2, 2007, Murakami et al.

U.S. Appl. No. 12/064,572, filed Feb. 22, 2008, Murakami et al.

* cited by examiner

METHOD AND DEVICE FOR MEASURING CIRCULATION QUANTITY OF BED MATERIAL IN CIRCULATING FLUIDIZED BED COMBUSTOR

TECHNICAL FIELD

The present invention relates to a method and device for measuring circulation quantity of bed material in a circulating fluidized bed combustor, said combustor being used for combustion of for example municipal and factory wastes or for recovery of combustion heat generated in combustion of fuel such as refuse derived fuel (RDF).

BACKGROUND ART

Recently, municipal and factory wastes have been steadily increasing and their disposal has become a social problem. Power generating units have been developed for recovery of combustion heat through incineration of such wastes or through use of refuse derived fuel.

One type of such power generating units is a circulating fluidized bed combustor which comprises, as shown in FIG. 1, a combustion furnace 1 for burning wastes such as municipal waste or fuel such as refused derived fuel while fluidizing them together with bed material 3 such as sand or limestone through primary air A blown through an air dispersion nozzle 2, a hot cyclone 4 as material separator connected to a top of the furnace 1 for capturing bed material such as ash or sand entrained in exhaust gas generated in combustion in the furnace 1, an external heat exchanger 7 as external recirculation unit into which introduced through a downcomer 5 is the bed material captured in the cyclone 4, said bed material being heated and returned through a bed material return pipe 6 into a bottom of the furnace 1or circulation, and a heat recovery part 10 into which introduced is the exhaust gas separated from the bed material in the cyclone 4 and which is internally provided with a superheater 8 and a fuel economizer 9.

Arranged in the heat recovery part 10 and downstream of the economizer 9 is a gas air heater 12 which heats air conveyed from a forced draft fan 11 through heat of the exhaust gas. The air heated by the heater 12 is fed as primary air A via a primary air line 13 to the bottom of the furnace 1, and is fed as secondary air B via a secondary air line 14 branched from the primary air line 13 sideways of the furnace 1. Air conveyed from a fluidizing air blower 15 is fed as fluidizing air C via a fluidizing air line 18 into a bottom of the heat exchanger 7. Incorporated in the primary air line 13 and downstream of the branch into the secondary air line 14 is a damper 16 for control in flow rate of the primary air A; incorporated in the secondary air line 14 is a damper 17 for control in flow rate of the secondary air B.

The external heat exchanger 7 is formed with a wind box 21 at a bottom of a seal box 19 into which the downcomer 5 is connected, so as to blow the fluidizing air C upwardly through an air dispersion nozzle 20. Arranged in the seal box 19 and above the nozzle 20 is a final superheater 22 which heat-exchanges with the bed material to generate and introduce superheated steam into a steam turbine. In view of the fact that generally the external heat exchanger 7 has higher pressure than a lower part of the combustion furnace 1 because of material-sealing below the downcomer 5 by the bed material, the external heat exchanger 7 is made in the form of so-called siphon for prevention of the exhaust gas in the furnace 1 from flowing into the lower part of the heat exchanger 7 or downcomer 5 and for reliable flow and return of the bed material separated in the cyclone 4 into the furnace 1.

In the above-mentioned circulating fluidized bed combustor as power generating unit, the air conveyed from the fan 11 and heated by the heater 12 is fed as primary air A via the line 13 into the bottom of the furnace 1 and fed as secondary air B via the line 14 branched from the line 13 sideways of the furnace 1, and the air conveyed from the blower 15 is fed as fluidizing air C via the line 18 into the bottom of the heat exchanger 7. In this state, waste such as municipal waste or refuse derived fuel is charged over the air dispersion nozzle 2 in the furnace 1 and is burned while being fluidized together with the bed material 3 through the primary air A blasted via the nozzle 2.

The exhaust gas generated by combustion of the waste in the furnace 1 is blown up together with the bed material such as ash or sand into the cyclone 4 where the bed material is captured. The bed material captured in the cyclone 4 is introduced through the downcomer 5 connected to the bottom of the cyclone 4 into the external heat exchanger 7 as external recirculation unit where the bed material is robbed of heat and returned through the return pipe 6 into the bottom of the furnace 1 for circulation.

The exhaust gas separated from the bed material in the cyclone 4 is guided to the heat recovery part 10 and is heat-recovered by the superheater 8 and economizer 9 in the heat recovery part 10 and further by the gas air heater 12, and then is passed through a dust collector or the like (not shown) and discharged through a flue to atmosphere.

Boiler feedwater is heated in the economizer 9 by the exhaust gas, caused to flow via a steam drum (not shown) into a furnace wall 1a of the furnace 1, returned again to the steam drum where it is turned out into saturated steam and guided to the superheater 8 The steam superheated by the exhaust gas and further superheated in the superheater 8 is guided to the final superheater 22 where the superheated steam is still further superheated by the bed material. The steam superheated in the superheater 22 is guided to the steam turbine where power generation is conducted.

In the above-mentioned circulating fluidized bed combustor, what amount a circulation quantity of the bed material is to be controlled to for uniformization and stabilization in temperature of the combustion furnace may be theoretically determined through systematic calculation or the like. In order to stabilize the operation in this manner, the circulation quantity of the bed material must be accurately grasped; conventionally, it has been conducted to qualitatively evaluate circulation quantity of bed material from pressure difference between combustion furnace 1 and hot cyclone 4.

Means for estimating circulation quantity of bed material has been disclosed, for example, in Reference 1.

[Reference 1] JP 2001-289406A

SUMMARY OF THE INVENTION

Problems to be Solved by the Invention

However, no actual means for quantitatively, not qualitatively, measuring an actual circulation quantity of bed material has been developed yet, so that it has become difficult to enhance accuracy in comparison of results of thermal balance examined through simulation or the like with actual operation results.

The means for estimating circulation quantity of bed material disclosed in Reference 1 is extremely complicate in system.

In view of the above, the invention was made to provide a method and device for measuring circulation quantity of bed material in a circulating fluidized bed combustor wherein actual circulation quantity of bed material can be quantitatively estimated extremely simply and accuracy can be enhanced in comparison of results of thermal balance examined through simulation or the like with actual operation results.

Means or Measures for Solving the Problems

The invention is directed to a method for measuring circulation quantity of bed material in a circulating fluidized bed combustor wherein exhaust gas from the combustion furnace is guided to a material separator for separation of bed material, the separated bed material being fed via a downcomer to an external recirculation unit, said bed material fed to the external recirculation unit being returned to the combustion furnace while fluidized by fluidizing air, said method which comprises, during stopped feeding of the fluidizing air to the external recirculation unit, measuring time required for the bed material accumulated in the downcomer to reach an upper predetermined height from a lower reference height and determining a flow rate of the bed material as circulation quantity from said time and an accumulated amount of the bed material based on an inner diameter of the downcomer.

In the method for measuring circulation quantity of bed material in the circulating fluidized bed combustor, a timer may be started when light projected to transversely transit the downcomer at a lower reference height is blocked off by the bed material accumulated in the downcomer, said timer being stopped when light projected to transversely transit the downcomer at an upper predetermined height is blocked off by the bed material accumulated in the downcomer, whereby the time can be measured which is required for the bed material accumulated in the downcomer to reach the upper predetermined height from the lower reference height.

It is preferable in this case that the lights projected to transversely transit the downcomer at the lower reference height and upper predetermined height are prevented from being blocked off by the bed material falling down in the downcomer.

The invention is also directed to a device for measuring circulation quantity of bed material in a circulating fluidized bed combustor wherein exhaust gas from the combustion furnace is guided to a material separator for separation of bed material, said separated bed material being fed via a downcomer to an external recirculation unit, said bed material fed to the external recirculation unit being returned to the combustion furnace while fluidized by fluidizing air, said device comprising lower detection means for sensing reaching of the bed material accumulated in the downcomer to the lower reference height during stopped feeding of the fluidizing air to the external recirculation unit, upper detection means for sensing reaching of the bed material accumulated in the downcomer to the upper predetermined height during stopped feeding of the fluidizing air to the external recirculation unit and arithmetic means for measuring time required for the bed material accumulated in the downcomer to reach an upper predetermined height from a lower reference height on the basis of detection signals from said lower and upper detection means, and for determining a flow rate of the bed material as circulation quantity from said time and an accumulated amount of the bed material based on an inner diameter of the downcomer.

In the device for measuring circulation quantity of bed material in the circulating fluidized bed combustor, the lower detection means may be constituted by a lower light sensor for receiving light projected to transversely transit the downcomer at the lower reference height, the upper detection means being constituted by an upper light sensor for receiving light projected to transversely transit the downcomer at the upper predetermined height, a timer in the arithmetic means being started when the light projected to transversely transit the downcomer at the lower reference height is blocked off by the bed material accumulated in the downcomer, said timer in the arithmetic means being stopped when the light projected to transversely transit the downcomer at the upper predetermined height is blocked off by the bed material accumulated in the downcomer, whereby the time can be measured which is required or the bed material accumulated in the downcomer to reach the upper predetermined height from the lower reference height.

It is preferable in this case that a roof member is arranged in the downcomer above the lower and upper light sensors so as to prevent the lights projected to transversely transit the downcomer at the lower reference height and upper predetermined height from being blocked off by the bed material falling down in the downcomer.

Effects of the Invention

A method and device for measuring circulation quantity of bed material in a circulating fluidized bed combustor according to the invention have excellent effects and advantages that actual circulation quantity of bed material can be quantitatively estimated extremely simply and that accuracy can be enhanced in comparison of results of thermal balance examined through simulation or the like with actual operation results.

Figure 1:
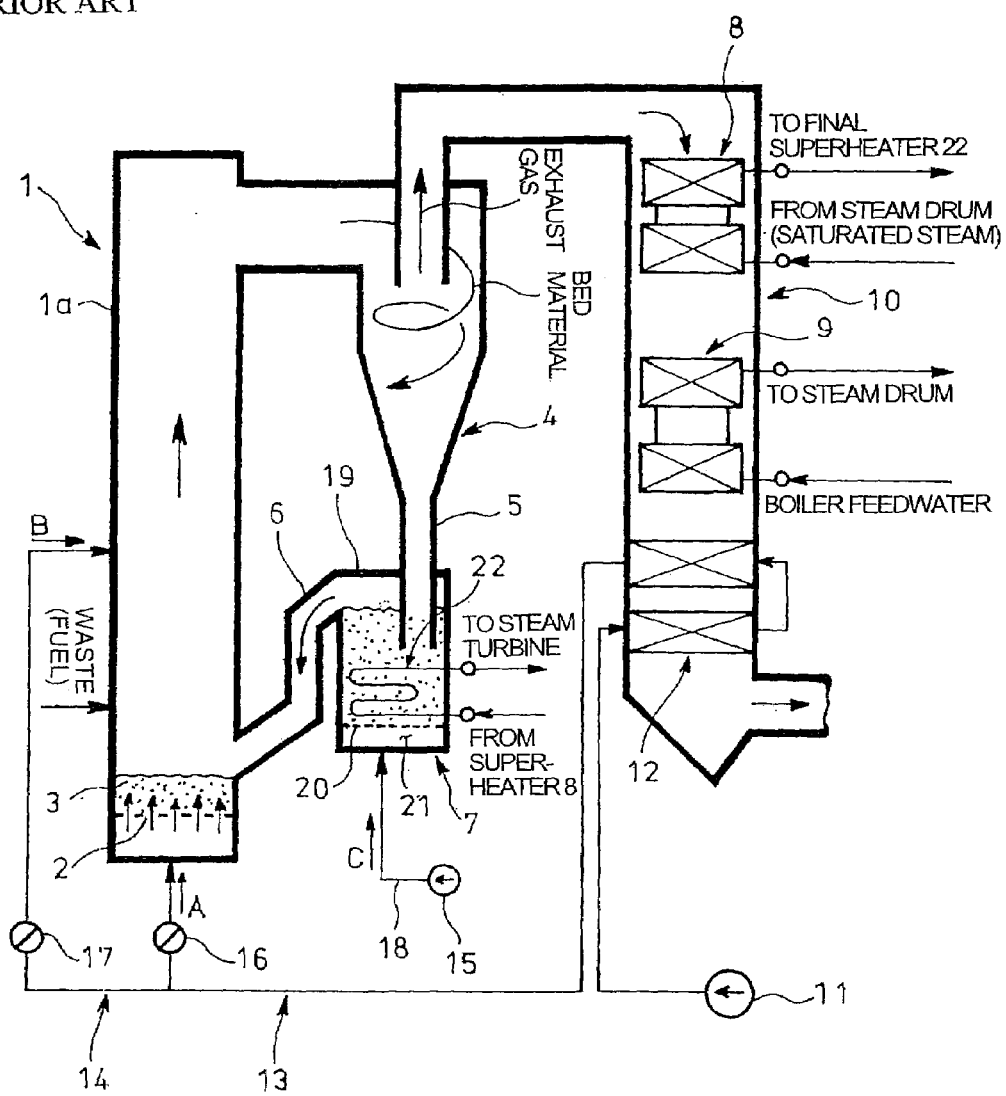
[FIG. 1] A plan view showing a conventional method and device for measuring circulation quantity of bed material in a circulating fluidized bed combustor.

EXPLANATION OF THE CHARACTERS 1 combustion furnace
4 hot cyclone (material separator)
5 downcomer
7 external heat exchanger (external recirculation unit)
23 lower detection means
24 upper detection means
25 arithmetic means
26 transmitted light window
27 transmitted light window
28 lower projector
29 lower optical receiver
30 lower light sensor
31 upper projector
32 upper optical receiver
33 upper light sensor
34 roof member
34' roof member
C fluidizing air
D inner diameter $H_0$ lower reference height
$H_1$ upper predetermined height

BEST MODE FOR CARRYING OUT THE INVENTION

An embodiment of the invention will be described in conjunction with attached drawings.

Figure 2:
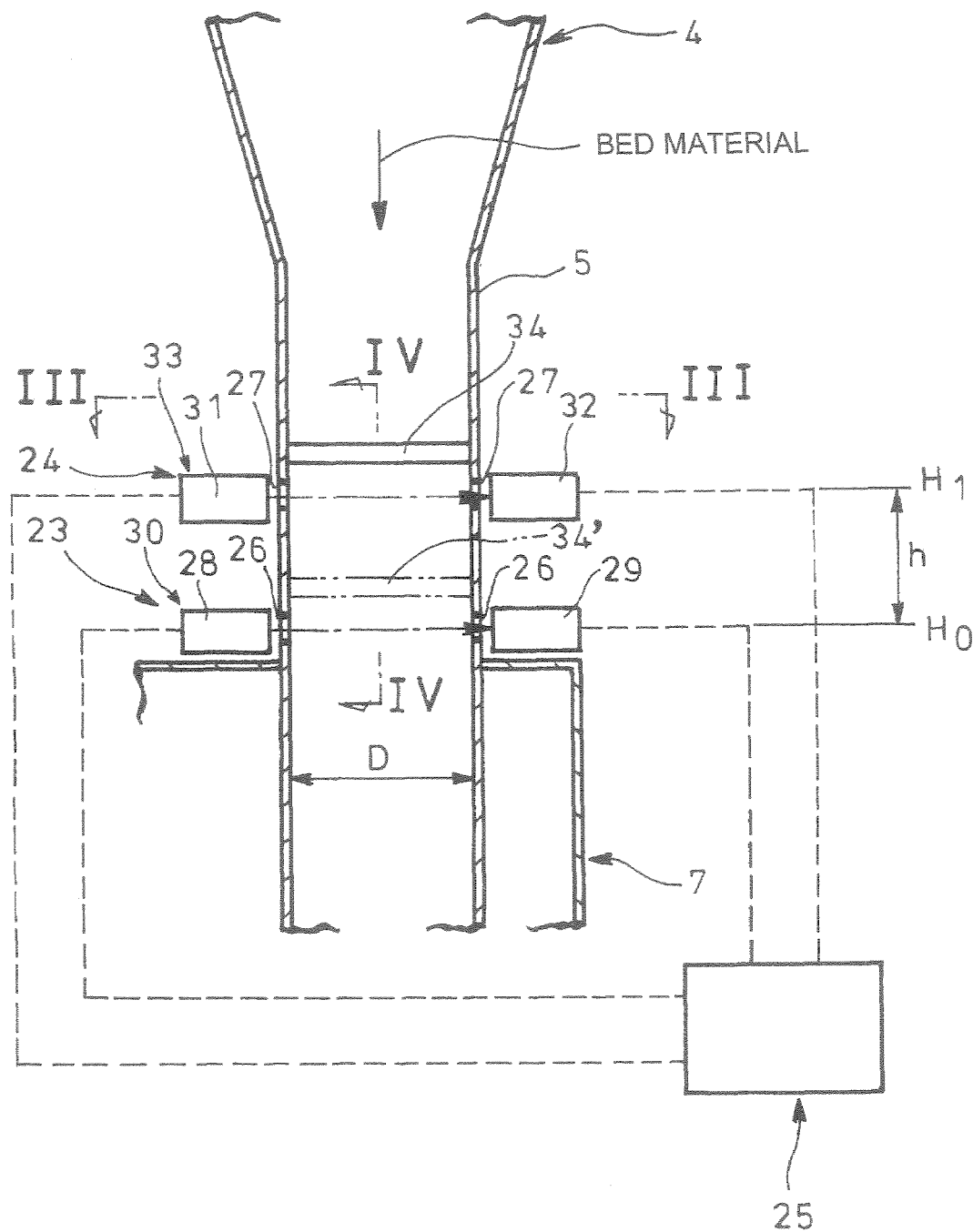
[FIG. 2] A schematic view showing a main portion of an embodiment according to the invention.
Figure 3:
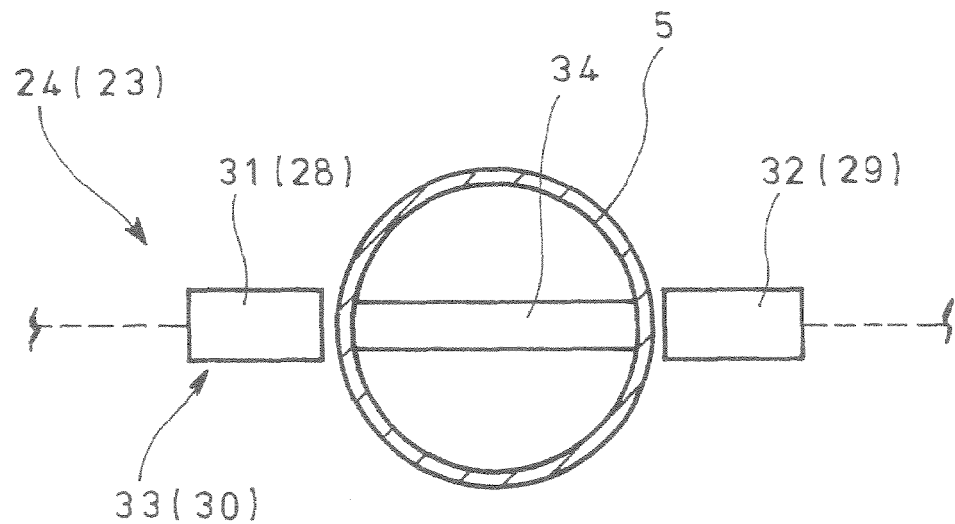
[FIG. 3] A sectional view looking in the direction of arrows III in FIG. 2.
Figure 4:
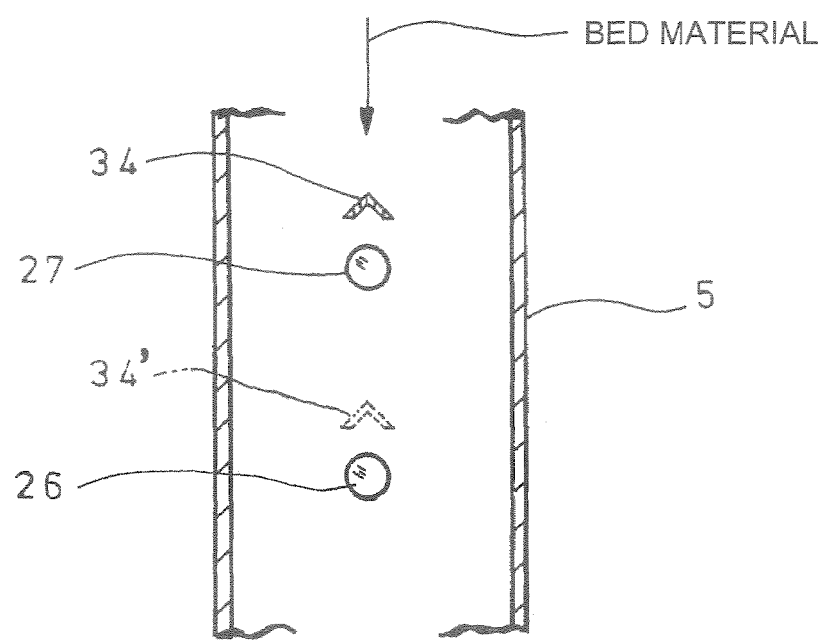
[FIG. 4] A sectional view looking in the direction of arrows IV in FIG. 2.

FIGS. 2-4 show the embodiment of the invention in which parts identical with those in FIG. 1 are represented by the same reference characters. It is fundamentally similar in structure to the known art shown in FIG. 1 and is characteristic in that, in utilization of the fact that in an operation of the circulating fluidized bed combustor, stopped feeding of the fluidizing air C (see FIG. 1) to an external heat exchanger 7 as external recirculation unit will result in no returning of bed material from the heat exchanger 7 via a bed material return pipe 6 to a bottom of a combustion furnace 1, it comprises as shown in FIGS. 2-4 lower detection means 23 for sensing reaching of the bed material accumulated in the downcomer 5 to a lower reference height $H_0$ during stopped feeding of fluidizing air C to the external heat exchanger 7, upper detection means 24 for sensing reaching of the bed material accumulated in the downcomer 5 to an upper predetermined height $H_1$ during stopped feeding of the fluidizing air C to the external heat exchanger 7 and arithmetic means 25 for measuring time t (sec.) required for the bed material accumulated in the downcomer 5 to reach the upper predetermined height $H_1$ from the lower reference height $H_0$ on the basis of detection signals from said lower and upper detection means 23 and 24 and for determining a flow rate Q (kg/sec.) of the bed material as circulation quantity from said time t and an accumulated amount V ($m^3$) of the bed material based on an inner diameter D (m) of the downcomer 5.

Diametrically oppositely arranged on the downcomer 5 or vertical pipe at the lower reference height $H_0$ are transmitted light windows 26 having heat-resisting quartz glass or the like buried therein; diametrically oppositely arranged on the downcomer 5 or vertical pipe at the upper predetermined height $H_1$ are transmitted light windows 27 having heat-resisting quartz glass or the like buried therein.

The lower detection means 23 is constituted by a lower light sensor 30 in which light projected from a lower projector 28 to transversely transit the downcomer 5 at the lower reference height $H_0$ via the transmitted light windows 26 is received by a lower optical receiver 29. The upper detection means 24 is constituted by an upper light sensor 33 in which light projected from an upper projector 31 to transversely transit the downcomer 5 at the upper predetermined height $H_1$ via the transmitted light windows 27 is received by an upper optical receiver 32. A timer in the arithmetic means 25 is started when the light of the lower light sensor 30 projected to transversely transit the downcomer 5 at the lower reference height $H_0$ is blocked off by the bed material accumulated in the downcomer 5. The timer in the arithmetic means 25 is stopped when the light of the upper light sensor 33 projected to transversely transit the downcomer 5 at the upper predetermined height $H_1$ is blocked off by the bed material accumulated in the downcomer 5. Thus measured is time t required for the bed material accumulated in the downcomer 5 to reach the upper predetermined height $H_1$ from the lower reference height $H_0$.

Arranged in the downcomer 5 above the lower and upper light sensors 30 and 33 is a roof member 34 which prevents the lights projected to transversely transit the downcomer 5 at the lower reference heights $H_0$ and upper predetermined height $H_1$ from being blocked off by the bed material falling down in the downcomer 5. The roof member 34 may be arranged as shown in solid line in FIG. 2, in the downcomer 5 at least above the upper light sensor 33; in addition to the roof member 34 a roof member 34' may be arranged, as shown in two-dotted chain line in FIG. 2, in the downcomer 5 above the lower light sensor 30.

Next, mode of operation of the embodiment will be described.

In the operation of the circulating fluidized bed combustor, when feeding of the fluidizing air C to the external heat exchanger 7 as the external recirculation unit (see FIG. 1) is stopped, the bed material is not returned from the external heat exchanger 7 via the return pipe 6 to the bottom of the combustion furnace 1, and is gradually accumulated in the downcomer 5.

The light projected from the lower projector 28 of the lower light sensor 30 constituting the lower detection means 23 to transversely transit the downcomer 5 at the lower reference height $H_0$ via the transmitted light windows 26 is received by the lower optical receiver 29 while the light projected from the upper projector 31 of the upper light sensor 33 constituting the upper detection means 24 to transversely transit the downcomer 5 at the upper predetermined height $H_1$ via the transmitted light windows 27 is received by the upper optical receiver 32. As the bed material is gradually accumulated in the downcomer 5, firstly the light of the lower light sensor 30 projected to transversely transit the downcomer 5 at the lower reference height $H_0$ is blocked off by the bed material accumulated in the downcomer 5.

When the light of the lower light sensor 30 is blocked off by the bed material accumulated in the downcomer 5, the timer in the arithmetic means 25 is started. Then, the light of the upper light sensor 33 projected to transversely transit the downcomer 5 at the upper predetermined height $H_1$ is blocked off by the bed material accumulated in the downcomer 5.

When the light of the upper light sensor 33 is blocked off by the bed material accumulated in the downcomer 5, the timer in the arithmetic means 25 is stopped. Thus, time t is measured which is required for the bed material accumulated in the downcomer 5 to reach the upper predetermined height $H_1$ from the lower reference height $H_0$.

Providing that height from the lower reference height $H_0$ to the upper predetermined height $H_1$ in the downcomer 5 is h (m) then the amount V of the bad material accumulated in the downcomer 5 between the lower reference height $H_0$ and the upper predetermined height $H_1$ is obtained by the following equation;

$$V = (\pi \cdot D^2/4) \cdot h$$

Then, providing that volume density of the bed material is δ (kg/$m^3$) the flow rate Q or circulation quantity of the bed material is obtained by the following equation;

$$Q = \delta \cdot V/t$$

If the circulation quantity of the bed material is much, the bed material falls down in large quantity from above in the downcomer 5; however, since the roof member 34 and, if required, the roof member 34' are arranged in the downcomer 5 above the lower and upper light sensors 30 and 33, there is no fear that the lights projected to transversely transit the downcomer 5 at the lower reference height $H_0$ and upper predetermined height $H_1$ are blocked off by the bed material falling down in the downcomer 5, so that circulation quantity of the bed material can be measured reliably and in high accuracy.

After completion of the measurement on the circulation quantity of the bed material, the feeding of the fluidizing air C to the external heat exchanger 7, which is stopped, is restarted, resulting in return to the ordinary operation.

Thus, the actual circulation quantity of the bed material can be quantitatively evaluated extremely simply and accuracy can be enhanced in comparison of results of thermal balance examined through simulation or the like with actual operation results.

It is to be understood that a method and device for measuring circulation quantity of bed material in a circulating fluidized bed combustor according to the invention is not limited to the above embodiment and that various changes and modifications may be made without departing from the scope of the invention. For example, the invention is applicable to a fluidized bed gasification system wherein the external heat exchanger as external recirculation unit is substituted by a gasification furnace for dryness and gasification of wet waste mainly made of biomass, wet refuse and/or sewerage, mainly flammable solid content being burned in the combustion furnace.

INDUSTRIAL APPLICABILITY

A method and device for measuring circulation quantity of bed material in a circulating fluidized bed combustor according to the invention is applicable when judgment is to be made on what amount circulation quantity of bed material is to be controlled to for uniformization and stabilization in temperature of a combustion furnace.

The invention claimed is:

1. A method for measuring circulation quantity of bed material in a circulating fluidized bed combustor wherein exhaust gas from the combustion furnace is guided to a material separator for separation of bed material, the separated bed material being fed via a downcomer to an external recirculation unit, said bed material fed to the external recirculation unit being returned to the combustion furnace while fluidized by fluidizing air,
    said method which comprises during stopped feeding of the fluidizing air to the external recirculation unit, measuring time required for the bed material accumulated in the downcomer to reach an upper predetermined height from a lower reference height and determining a flow rate of the bed material as circulation quantity from said time and an accumulated amount of the bed material based on an inner diameter of the downcomer.

2. A method for measuring circulation quantity of bed material in a circulating fluidized bed combustor downcomer as claimed in claim 1, wherein a timer is started when light projected to transversely transit the downcomer at the lower reference height is blocked off by the bed material accumulated in the downcomer, said timer being stopped when light projected to transversely transit the downcomer at the upper predetermined height is blocked off by the bed material accumulated in the downcomer, whereby the time is measured which is required for the bed material accumulated in the downcomer to reach the upper predetermined height from the lower reference height.

3. A method for measuring circulation quantity of bed material in a circulating fluidized bed combustor as claimed in claim 2, wherein the lights projected to transversely transit the downcomer at the lower reference height and upper predetermined height are prevented from being blocked off by the bed material falling down in the downcomer.

4. A device for measuring circulation quantity of bed material in a circulating fluid-zed bed combustor wherein exhaust gas from the combustion furnace is guided to a material separator for separation of bed material, said separated bed material being fed via a downcomer to an external recirculation unit, said bed material fed to the external recirculation unit being returned to the combustion furnace while fluidized by fluidizing air,
    said device comprising
        lower detection means for sensing reaching of the bed material accumulated in the downcomer to the lower reference height during stopped feeding of the fluidizing air to the external recirculation unit,
        upper detection means for sensing reaching of the bed material accumulated in the downcomer to the upper predetermined height during stopped feeding of the fluidizing air to the external recirculation unit and
        arithmetic means for measuring time required for the bed material accumulated in the downcomer to reach an upper predetermined height from a lower reference height on the basis of detection signals from said lower and upper detection means, and for determining a low rate of the bed material as circulation quantity from said time and an accumulated amount of the bed material based on an inner diameter of the downcomer.

5. A device or measuring circulation quantity of bed material in a circulating fluidized bed combustor as claimed in claim 4, wherein the lower detection means is be constituted by a lower light sensor for receiving light projected to transversely transit the downcomer at the lower reference height, the upper detection means being constituted by an upper light sensor for receiving light projected to transversely transit the downcomer at the upper predetermined height, a timer in the arithmetic means being started when the light projected to transversely transit the downcomer at the lower reference height is blocked off by the bed material accumulated in the downcomer, said timer in the arithmetic means being stopped when the light projected to transversely transit the downcomer at the upper predetermined height is blocked off by the bed material accumulated in the downcomer, whereby the time is be measured which is required for the bed material accumulated in the downcomer to reach the upper predetermined height from the lower reference height.

6. A device for measuring circulation quantity of bed material in a circulating fluidized bed combustor as claimed in claim 5, wherein a roof member is arranged in the downcomer above the lower and upper light sensors so as to prevent the lights projected to transversely transit the downcomer at the lower reference height and upper predetermined height from being blocked off by the bed material falling down in the downcomer.

* * * * *